Feb. 22, 1927.
A. H. R. FEDDEN ET AL
1,618,870
LUBRICATION OF ENGINES AND MACHINES
Filed April 9, 1924
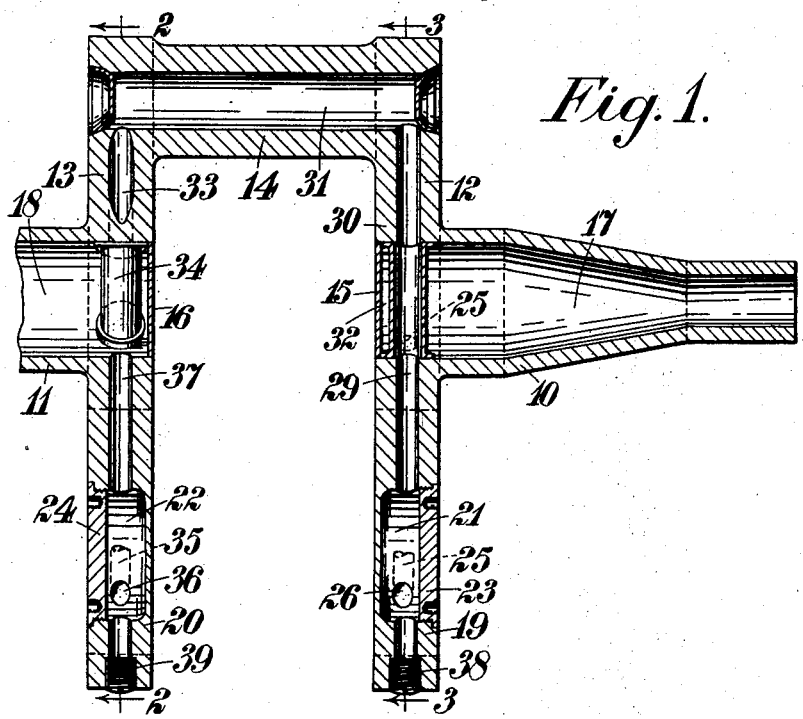
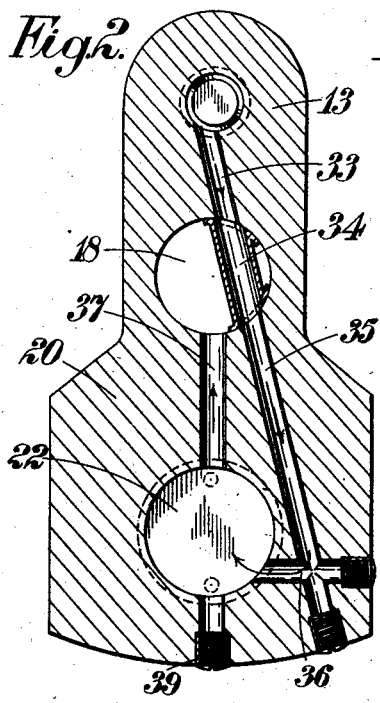
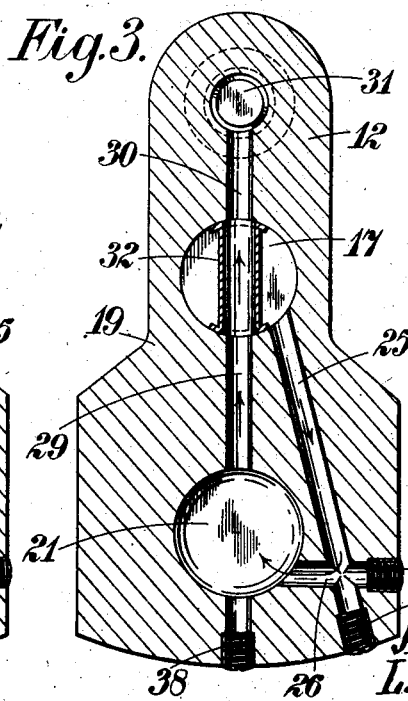
Inventors
A. H. R. Fedden and
L. F. G. Butler
by Wilkinson & Giusta
Attorneys.

Patented Feb. 22, 1927.

1,618,870

UNITED STATES PATENT OFFICE.

ALFRED HUBERT ROY FEDDEN AND LEONARD FREDERICK GEORGE BUTLER, OF BRISTOL, ENGLAND, ASSIGNORS TO THE BRISTOL AEROPLANE COMPANY LIMITED, OF BRISTOL, GLOUCESTER, ENGLAND, A BRITISH COMPANY.

LUBRICATION OF ENGINES AND MACHINES.

Application filed April 9, 1924, Serial No. 705,338, and in Great Britain April 14, 1923.

This invention is for improvements in or relating to the lubrication of engines and machines, and has for its object to provide an improved construction and arrangement of the parts concerned whereby the system of lubrication is simplified. In certain kinds of machinery, such for example as engines for aircraft, it is essential that the lubrication should be continuous and effective, and that the lubricant should be kept clean. In addition to using filters in the lubrication circuit, centrifugal separators have been provided as an integral part of the lubrication circuit, for the purpose of effecting additional cleansing of the lubricating oil. Heretofore, such centrifugal separators have been provided as additional parts driven by the engine wherewith they are used, the necessary piping being also provided to include such separator in the lubrication circuit.

According to this invention there is provided in the lubrication system of an engine or machine, a chamber in the oil circuit, which chamber is formed in or on a portion of the mechanism that is provided primarily for some other purpose and rotates at a high speed, and in order that this chamber may operate as a centrifugal separator for the oil passing through it, it is formed with a pocket or part that is more remote from the centre of rotation of the said portion of mechanism than are the inlet and outlet openings communicating with the chamber.

This invention also comprises the particular application of the invention to an internal-combustion engine in which the lubricating system includes a passage formed in a rotating crank-shaft, and consists in the addition to said passage of a chamber formed in a balance-weight or crank-web of the shaft, an inlet duct leading from the supply passage in the crank-shaft to said chamber at a point other than the part of the chamber most remote from the centre of the crank-shaft, and an outlet duct leading from said chamber at a point other than the part most remote from the centre of rotation to another part of the crank-shaft. Preferably the said outlet duct opens from that part of the chamber which is nearest to the centre of rotation of the crank-shaft.

In the accompanying drawings, which illustrate the application of this invention to a single-throw crank-shaft for an internal-combustion engine—

Figure 1 shows in longitudinal central section so much of the crank-shaft as is necessary to the understanding of this invention;

Figure 2 is a section on the line 2—2 of Figure 1 showing the arrangement of one of the crank-webs and balance-weights; and Figure 3 is a similar view in section on the line 3—3 of Figure 1 showing the other web and balance-weight.

Like reference characters indicate like parts throughout the drawings.

Referring to these drawings, the crank-shaft comprises two hollow shaft-portions 10, 11 respectively connected by webs 12, 13 and a crank-pin 14. The inner ends of the shaft-portions are closed by any suitable means at 15, 16 respectively, and the lubricating oil is introduced under pressure into the space 17 within the shaft portion 10 and passes out from the space 18 in the shaft-portion 11.

Each of the crank-webs 12, 13 is extended on the other side of the shaft 10, 11 to constitute balance-weights 19, 20 respectively, and a chamber is formed in each of these balance-weights, as indicated at 21, 22 respectively. These chambers are conveniently of cylindrical shape and extend to one face of the balance-weight, being closed at that face by means of screwed plugs 23, 24 respectively.

A passage 25 is bored obliquely through the balance-weight 19 (see Figure 3) so as to communicate with the space 17 of the shaft, and a transverse passage 26 is bored from one side of the balance-weight to provide communication between the passage 25 and the chamber 21 at a point nearer to the axis of rotation of the crank-shaft than the most remote part of that chamber. The ends of the passages 25, 26 are closed by plugs 27, 28 respectively, and these passages constitute the inlet duct from the space 17 to the chamber 21.

The outlet duct from this chamber is formed by boring a passage 29 along the centre-line of the balance-weight 19 to the space 17, and continuing it by a similar passage 30 through the crank-web 12 to communicate with the interior 31 of the hollow crank-pin 14. A pipe connection 32 is secured within the hollow shaft to connect the two passages 29, 30 with one another and to separate them from the space 17 of the shaft.

The outlet for the lubricating oil from the space 31 is provided by a passage 33 which extends obliquely from it to the inner face of the part 11 of the shaft where the passage is continued by means of a tubular member 34 inserted within the crankshaft to provide communication with a further passage 35 bored though the balance-weight 20. A transverse passage 36 provides communication from the passage 35 into the chamber 22, and the outlet from this chamber is similarly constituted by a passage 37 which communicates with the space 18 of the shaft-portion 11.

The oil delivered into the space 17 of the shaft-portion 10 passes by the passages 25, 26 into the chamber 21 and owing to the rotation of the shaft it is therein subjected to a centrifugal separating effect, the heavy impurities collecting in that part of the chamber most remote from the axis of rotation of the shaft. The oil thus cleansed passes by the passages 29, 32, 30 to the crank-pin passage 31, and from thence by means of the passages 33, 34, 35 to the chamber 22 where it is subjected to a second centrifugal separation before passing to the space 18 in the shaft-portion 11. The chambers 21, 22 are cleaned at intervals by removals of the plugs 23, 24, and conveniently also by removal of the plugs 38, 39 closing the ends of the passages 29, 37 respectively, as the blind end of these passages serve to collect the impurities separated from the oil.

It will be understood that this invention is not limited to the particular construction hereinbefore described, since the centrifugal separator may be formed in any existing rotating part of the engine or machine provided that the rate of rotation is sufficiently high to give the desired separating effect, and that the inlet and outlet ducts for the chamber are arranged in the requisite manner to provide a pocket for the accumulation of the separated impurities.

It will furthermore be seen that this invention offers considerable advantages in that the provision of a special centrifugal machine and its driving mechanism is rendered unnecessary, since existing parts are used for this purpose, so that a considerable saving of weight and complexity is ensured. Moreover, in the particular construction hereinbefore described, the provision of the chambers which constitute the centrifugal separator necessitates very little more machining than is called for by the ordinary lubricating system of an internal-combustion engine without any centrifugal separator in it, so that the whole arrangement is inexpensive compared with the known system of using centrifugal machines It has heretofore been proposed to provide a crankshaft having a continuous crooked oil conduit extending longitudinally through it and through the crankpins of the shaft, the parts of which conduit situated in the crankpins were slightly larger as to cross-sectional area than other parts of the conduit and extended to a point further away from the axis of rotation than the junctions therewith of the adjacent parts, but these parts of the conduit in the crankpins did not function as centrifugal separating chambers because, apart from the blind ends closed permanently by plugs, the oil flowed solidly through them, whereby the settling of sediment was prevented, and no claim is made herein to such a known system of lubrication.

What we claim as our invention and desire to secure by Letters Patent is:—

In the lubrication system of a mechanism the combination of a rotatable hollow crankshaft through which oil is circulated, a balance-weight on the crank-shaft, which balance-weight has a chamber formed therein, removable closure means for said chamber, means providing communication from one part of the interior of the crank-shaft to said chamber at a point thereof nearer to the axis of rotation of the shaft than is another part of the chamber, and means providing communication from another point in said chamber that also is nearer to the axis of rotation of the crank-shaft than is the said other part of the chamber, to another part of the interior of the crank-shaft, substantially as set forth.

In testimony whereof we have signed our names to this specification.

ALFRED HUBERT ROY FEDDEN.
LEONARD FREDERICK GEORGE BUTLER.